(12) United States Patent
Atamaniuk et al.

(10) Patent No.: US 8,121,325 B2
(45) Date of Patent: Feb. 21, 2012

(54) EAR MODULE FOR A PERSONAL SOUND SYSTEM

(75) Inventors: Andy P. Atamaniuk, Redwood City, CA (US); Rodney Perkins, Woodside, CA (US); Caslav V. Pavlovic, Palo Alto, CA (US); Nicholas R. Michael, San Francisco, CA (US)

(73) Assignee: Sound ID, Palo Alto, CA (US)

( * ) Notice: Subject to any disclaimer, the term of this patent is extended or adjusted under 35 U.S.C. 154(b) by 316 days.

(21) Appl. No.: 12/521,902

(22) PCT Filed: Jan. 7, 2008

(86) PCT No.: PCT/US2008/050408
§ 371 (c)(1),
(2), (4) Date: Jul. 1, 2009

(87) PCT Pub. No.: WO2008/086286
PCT Pub. Date: Jul. 17, 2008

(65) Prior Publication Data
US 2010/0027824 A1 Feb. 4, 2010

Related U.S. Application Data

(60) Provisional application No. 60/883,704, filed on Jan. 5, 2007.

(51) Int. Cl.
*H04R 25/00* (2006.01)
(52) U.S. Cl. .................. 381/322; 381/328; 381/370
(58) Field of Classification Search .................. 381/312, 381/316, 320–323, 328, 370, 380; 181/129, 181/130, 132, 135
See application file for complete search history.

(56) References Cited

U.S. PATENT DOCUMENTS

| 5,715,321 | A | 2/1998 | Andrea et al. |
| 2002/0027996 | A1 | 3/2002 | Leedom et al. |
| 2003/0165248 | A1 | 9/2003 | Lenz et al. |
| 2003/0174853 | A1 | 9/2003 | Howes et al. |
| 2005/0248717 | A1 | 11/2005 | Howell et al. |

FOREIGN PATENT DOCUMENTS

WO 2006/104981 10/2006

OTHER PUBLICATIONS

Office Action Mailed Mar. 11, 2011 in co-owned, co-pending U.S. Appl. No. 11/909,154, 11 pages.
Response filed Mar. 24, 2011 to the Office Action Mailed Mar. 11, 2011 Office Action in co-owned, co-pending U.S. Appl. No. 11/909,154, 2 pages.
International Search Report for PCT/US08/50408 mailed Jun. 27, 2008.

*Primary Examiner* — Tuan Nguyen
(74) *Attorney, Agent, or Firm* — James F. Hann; Haynes Beffel & Wolfeld LLP

(57) ABSTRACT

An ear module, which can be selectively worn on either left or right ear, comprises an interior lobe, adapted to fit within the concha, comprising a speaker and a compressive member/cover assembly. The compressive member/cover assembly is positionable, typically rotatable, relative to the remainder of the inner lobe between left and right ear orientations to permit the ear module to be worn on either the left or the right ear. A method for improving the quality of sound emanating from an ear module includes selecting the sound bore within the ear module to help improve the frequency response of the ear module so that the ear module has a resonant peak near 2.7 kHz and a maximum 20 dB decrease in high frequency response as measured at 5 kHz from the average frequency response as measured at 500 Hz, 800 Hz, and 1600 Hz.

20 Claims, 15 Drawing Sheets

RIGHT EAR CONFIGURATION

LEFT EAR CONFIGURATION

EAR MODULE FOR A PERSONAL SOUND SYSTEM

BACKGROUND OF THE INVENTION

1. Field of the Invention

The present invention relates to ear modules for personal sound systems, adapted to be worn on the ear and provide audio processing.

2. Description of Related Art

Ear modules, including head-phones, earphones, head sets, hearing aids and the like, are adapted to be worn at the ear of a user and provide personal sound processing. A wide variety of such devices has been developed to deal with the problems of secure positioning at the ear and comfort for the user. One technique to secure an ear module is based on a fitting adapted to fit within the concha of the outer ear, including a compressive member providing a holding force between the anti-helix and the forward wall of the ear canal beneath the tragus. See, Patent Publication No. US 2003/0174853 A1, entitled Anti-Helix-Conforming Ear-Mount for Personal Audio Set, published Sep. 18, 2003.

It is desirable to provide an ear module that can be secured safely to the ear and that is suitable for housing audio processing resources.

SUMMARY OF THE INVENTION

A first example of an ear module can be selectively worn on either left or right ear. Each ear includes an ear canal with an exterior opening, a forward wall, a rear wall, a concha, an anti-helix and a tragus. The ear module comprises a housing for data processing resources, including an outer lobe and an interior lobe coupled to the outer lobe. The inner lobe comprises an extension and a speaker, the inner lobe adapted to fit within the concha. The inner lobe comprises a compressive member/cover assembly, the compressive member/cover assembly comprising a compressive member and the extension. The compressive member provides a holding force between the anti-helix and the forward wall of the ear canal thereby securing the ear module on the year. The extension is adapted to extend into the exterior opening of the ear canal. At least the compressive member is positionable relative to the outer lobe between left and right ear orientations to permit the ear module to be worn on either the left target ear or the right target ear. In some embodiments the compressive members/cover assembly is positionable between the left and right ear orientations and is rotatable relative to the remainder of the inner lobe. The compressive member/cover assembly may be a one-piece resilient element. In some embodiments the ear module includes a radio, a microphone and a data processor within the housing, the data processor adapted to process sound picked up by the microphone and sound received over the radio, and to play the processed sound on the speaker. Some embodiments include a set of the compressive member/cover assemblies, the compressive member/cover assemblies having different sized compressive members to fit different sizes of ears.

One example of a method for improving the quality of sound emanating from an ear module, the ear module of the type comprising a speaker and a portion extending into the ear canal of the user, the portion defining a sound bore having an exit and an entrance, proceeds as follows. The shape for the sound bore is selected. The length for the sound bore is selected. At least one cross-sectional size for the sound bore at positions along the axis is selected. The speaker is positioned at or near the entrance. The selecting and positioning steps are carried out to help improve the frequency response of the ear module so that the ear module has a resonant peak near 2.7 kHz and a maximum 20 dB decrease in high frequency response as measured at 5 kHz from the average frequency response as measured at 500 Hz, 800 Hz, and 1600 Hz. In some embodiments sound deflector structure for the entrance of the sound bore is chosen and the sound deflecting structure is positioned at the entrance to direct sound from the speaker into the entrance.

Other aspects and advantages of the present invention can be seen on review of the drawings, the detailed description and the claims, which follow.

DETAILED DESCRIPTION

Figure 1:
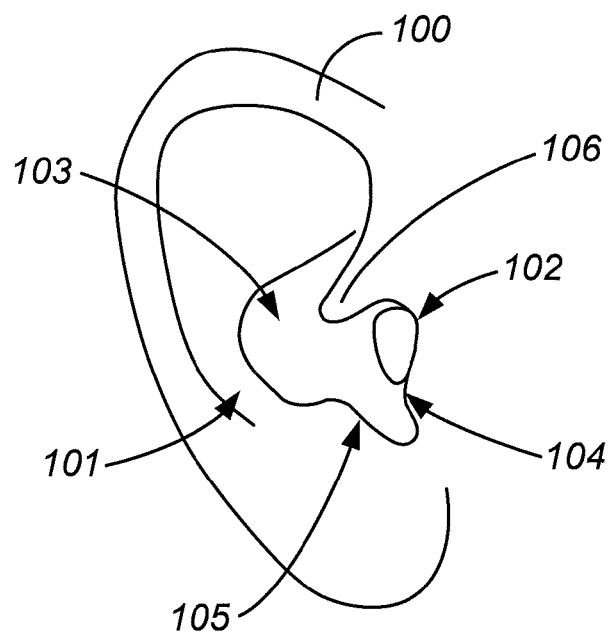
FIG. 1 is a simplified diagram of an outer ear.

The following description will typically be with reference to specific structural embodiments and methods. It is to be understood that there is no intention to limit the invention to the specifically disclosed embodiments and methods but that the invention may be practiced using other features, elements, methods and embodiments. Preferred embodiments are described to illustrate the present invention, not to limit its scope, which is defined by the claims. Those of ordinary skill in the art will recognize a variety of equivalent variations on the description that follows. Like elements in various embodiments are commonly referred to with like reference numerals.

FIG. 1 is a simplified diagram of an outer ear, or auricle, which is described here for the purposes of context. The outer ear includes the helix 100 which is the outer frame of the auricle typically with a rolled up edge. The antihelix 101 is a folded "Y" shaped part of the ear between the helix 100 and the ear canal 102. The region between the antihelix 101 and the helix 100 is known as the scapha. The hollow bowl like portion fixed to the ear canal 102 and framed by the antihelix 101 is the concha 103. The tragus 104 is a small projection just in front of the ear canal 102. The anti-tragus 105 is the lower cartilaginous edge of the concha. The distance A between the forward wall 108 (see FIG. 2) of the ear canal 102 to the antihelix 101 ranges widely. For example, an ear module can be designed for a target ear within a range of ear sizes in which the distance A can vary from about 20 to 35 mm. The width of the concha 103 between the anti-tragus 105 and the ridge 106 of the helix 100 as it enters the concha 103 ranges widely also. For example, an ear module can be designed for a target ear within a range of ear sizes in which width of the concha 103 can vary from about 10 to 20 mm. It will be understood that the device described herein is designed for fitting within a target ear, which has dimension relevant to the fit of the ear module falling within respective ranges of sizes.

Figure 2:
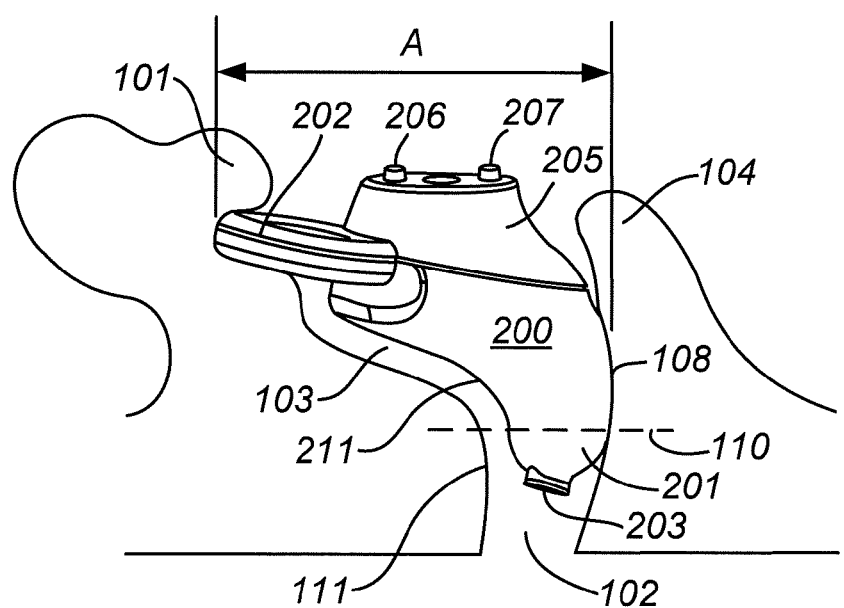
FIG. 2 illustrates the fit of the interior lobe of an embodiment of an ear module within the ear.

FIG. 2 illustrates the interior lobe 200 of an ear module, and its fit within the ear from a section view between the tragus 104 and the antihelix 101. The interior lobe 200 includes an extension 201 adapted to extend into the exterior opening 110 of the ear canal 102. The ear module includes a compressive member 202 (referred to herein as an ear loop) coupled to the interior lobe 200, providing a holding force between the antihelix 101 and the forward wall 108 of the ear canal 102 near the tragus 104. As illustrated, the extension 201 fits within the ear canal 102 without blocking the opening 110 of the ear canal between the forward wall 108 and the rear wall 111, into the concha 103. The tip 203 of the extension 201 on the interior lobe 200 of the ear module includes a speaker suitable for hearing aid functionality. As mentioned above, the distance A varies significantly for the target ear. The variation in the distance A for the target ear can be accommodated by providing the ear module in a kit that includes a number of various sizes of ear loops.

FIG. 2 illustrates the position of the opening 110 of the ear canal to the concha 103. The extension 201 has a width in a dimension orthogonal to the forward wall 108 of the ear canal at the opening 110, and over a length of the extension from at least the opening 110 to the tip 203 of the extension 201 that is substantially less than the width of the ear canal for the target ear size, leaving an open air passage through the ear canal into the concha 103. Although FIG. 2 shows the rear surface 211 of the interior lobe 200 spaced away from the surface of the ear in the concha 103, in embodiments of the technology, the interior lobe 200 actually rests on the surface of the ear in his region. However, the shape of the surface of the concha in this region is somewhat irregular compared to the surface of the interior lobe of the ear module, leaving air gaps. Therefore, the extension 201 and interior lobe 200 fit within the concha and beneath the tragus, without filling the concha, and leaving a region within the concha that is in air flow communication with the open air passage in the ear canal. This provision of air gaps is facilitated by ear loops 202 biasing extension 201 against forward wall 108 as illustrated in FIG. 2.

As illustrated in FIG. 2, the interior lobe 200 of the ear module has a widest point generally along the line between antihelix 101 and a forward wall 108 of the ear canal. The interior lobe 200 includes an upper extension 205 adapted to support an exterior lobe of the ear module in which the majority of the data processing resources are housed. Posts 206, 207 illustrated in FIG. 2 provide for coupling the interior lobe with the exterior lobe (not shown in FIG. 2). In one embodiment, the only component within the interior lobe 200 is the speaker at the tip 203. The upper extension 205 extends outwardly from the ear to support the exterior lobe of the ear module in a position spaced away from the antihelix and the tragus, so that an opening for outside air through the concha into the open air passage in the ear canal is provided around the exterior and interior lobes of the ear module.

Figure 3:
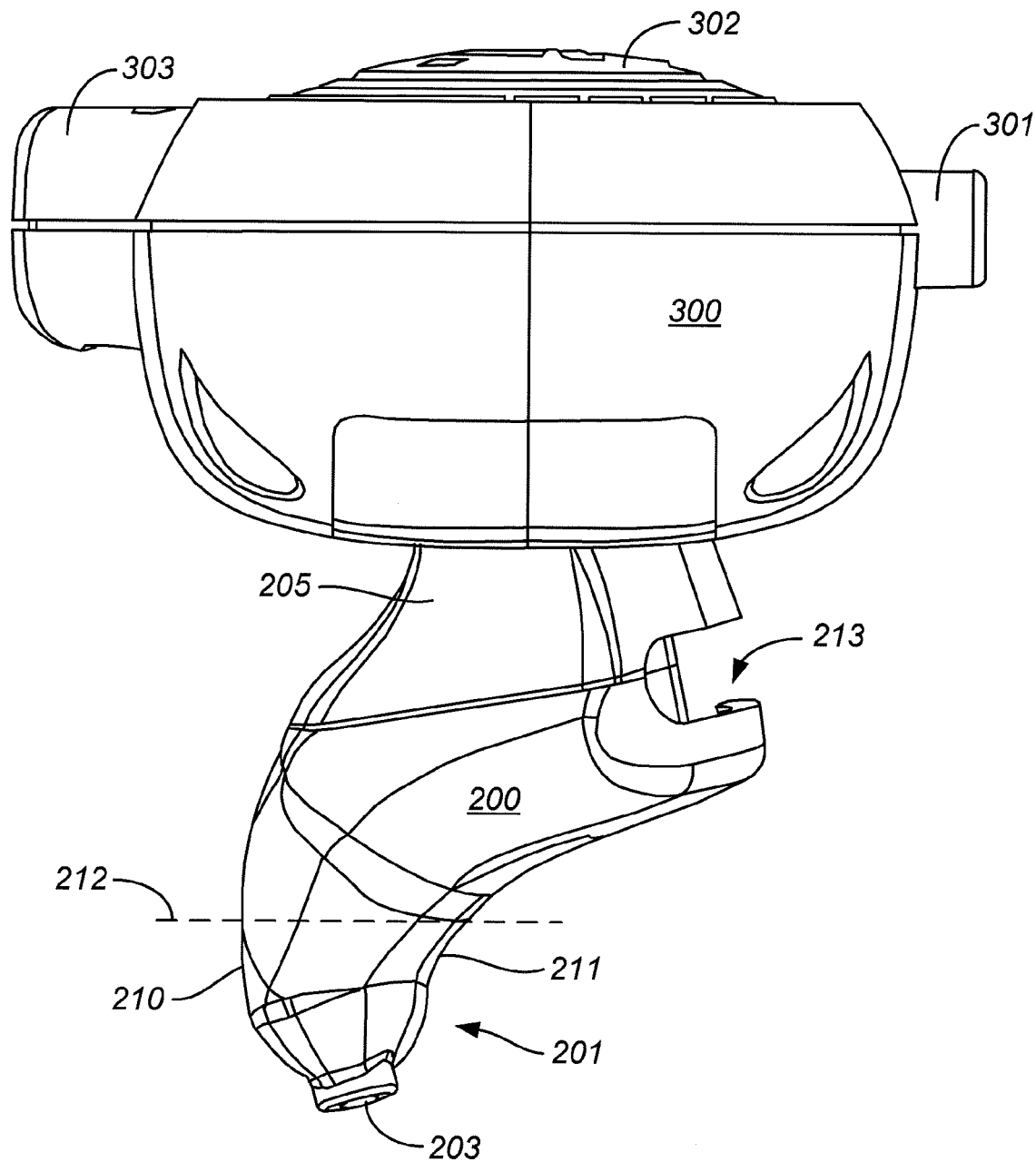
FIG. 3 is a top view of the ear module housing of FIG. 2 without the compliant ear loop.

FIG. 3 is a more detailed top view of the ear module including an exterior lobe 300 and the interior lobe 200. The interior lobe 200 has a forward surface 210 adapted to fit against the forward wall of the ear canal as described with reference to FIG. 2. The interior lobe 200 has a rear surface 211, opposite the forward surface 210. The dimension at a location 212 corresponding to the opening of the ear canal on a target ear is less than the width of the ear canal at the opening. For example, in a representative embodiment, the dimension at location 212 is about five millimeters leaving an air gap about one to two millimeters wide between a rear surface 211 and the rear wall of the ear canal (rear wall 111 in FIG. 2) in the target ear size.

The interior lobe 200 includes slot 213 adapted to receive a corresponding rail on an ear loop, to secure the ear loop onto the ear module. The exterior lobe 300 is substantially larger than the concha on the target ear, and houses data processing resources as mentioned above. In FIG. 3, a user input button 301 on the rear surface of the exterior lobe 300 and a user input button 302 on the outward surface of the module 300 are illustrated. Also, an extension 303 of the exterior lobe 300 adapted to house one or more microphones, including for example an omnidirectional microphone and a directional microphone directed at the mouth of the wearer, is included.

Figure 4:
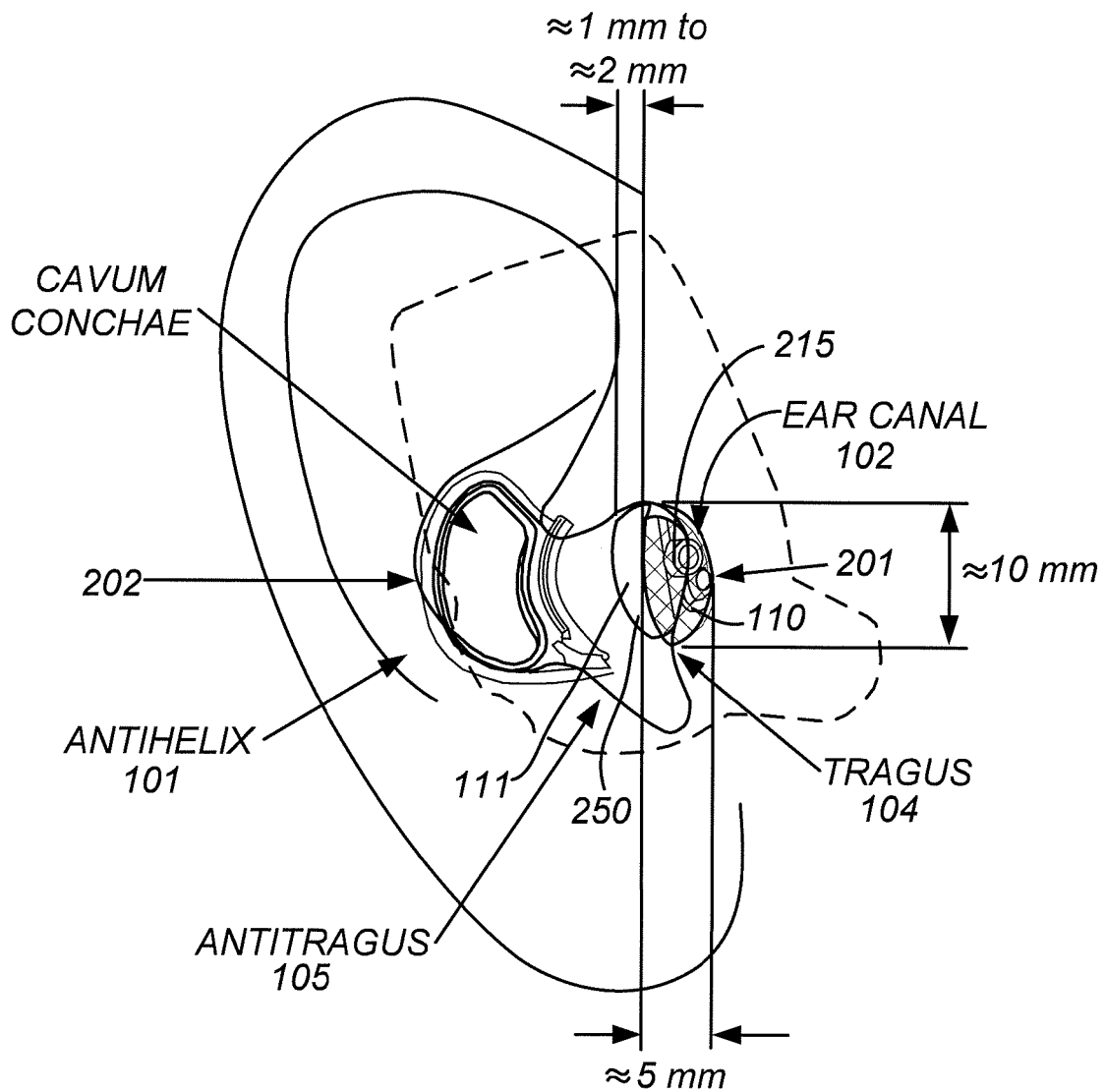
FIG. 4 is a top, cut away view illustrating fit of the interior lobe of the ear module housing of FIG. 2 within the ear canal and the concha.

FIG. 4 illustrates placement of the ear loop 202 against the antihelix 101, and a slice 215 of the interior lobe 200 taken at the location 212 at the entrance of the ear canal beneath the tragus 104 on the target ear. The forward surface 210 of the slice 215 fits against the forward wall 110 of ear canal. The vertical dimension of the slice 215 is about 10 millimeters in the embodiment illustrated for the target ear. The horizontal dimension of the slice 215 is about five millimeters as illustrated in the figure for a typical target ear. An air gap 250 of about one to two millimeters wide between the slice 215 and a rear surface 111 of the ear canal is formed in the target ear.

Figure 5:
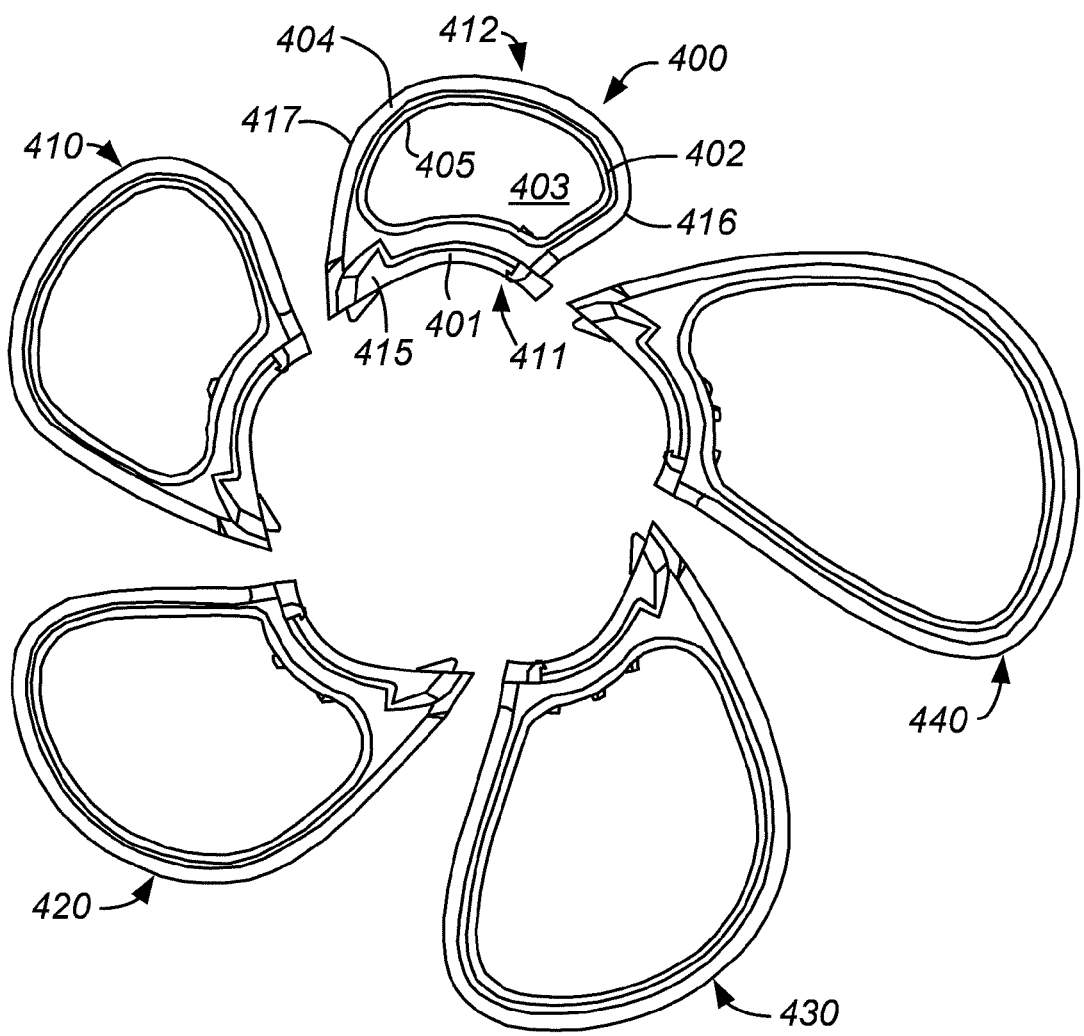
FIG. 5 is a side view of a set of ear loops adapted for use with the ear module of FIG. 2.

FIG. 5 illustrates a set of ear loops 400, 410, 420, 430, 440, of various sizes. In the illustrated embodiment, an ear loop 400 is representative. The ear loop 400 is adapted to fit in the slot 213 on the interior lobe 200 of the ear module. The ear loop 400 includes a near side member 411 adapted to removably couple with the interior lobe 200 of the ear module. In the illustrated embodiment, the near side member includes a base rail 401 with a stop structure 415 adapted to fit within the slot 213 on the interior lobe 200 of the ear module and secure the loop 400 to the module. The loop 400 has a rim 402 having a shape adapted to fit against the anti-helix of a target ear. In the illustrated embodiment, the loop 400 includes a far side member 412 which has substantially the same shape in each member of the set. The loop 400 includes a pair of first and second linking side members having lengths selected for a target ear size. The loops 410, 420, 430 and 440 have near side members 411 and far side members 412 that have substantially the same shape, and have respective pairs of first and second linking side members 416, 417 which have different lengths to fit different sizes of ears. The first and second linking side members 416, 417 do not normally contact the ear over any significant portion of their lengths, improving the flexibility of the ear loop. A set of various sizes of the ear loop 400 is delivered in a kit with the ear module, so that the user may select the appropriate size. In one representative set of ear loops, ear loop 400 is adapted for fitting a target ear in which the distance A (FIG. 2) is about 23.3 mm; ear loop 410 is adapted for fitting a target ear in which the distance A is about 27.2 mm; ear loop 420 is adapted for fitting a target ear in which the distance A is about 28.6 mm; ear loop 430 is adapted for fitting a target ear in which the distance A is about 30.8 mm; ear loop 440 is adapted for fitting a target ear in which the distance A is about 32.8 mm.

The material of the loop 400 deforms when inserted in the ear, and provides compressive force against the interior lobe of the ear module. The loop 400 preferably includes an opening 403 inside the rim 402, which facilitates fit of the ear loop within the ear and provides for air flow into the open air passage within the ear canal. In the illustrated embodiment, the rim 402 includes a broader exterior rim 404 and a more narrow interior rim 405. The ear loops in the set can be made using a variety of flexible elastomer materials, such as a thermo-plastic elastomer TPE suitable for injection molding. In one embodiment, a TPE having durometer of Shore A 64 was used. The material is selected empirically, so that it is not too hard for comfort and not too soft so that it stays within the ear.

Figure 6:
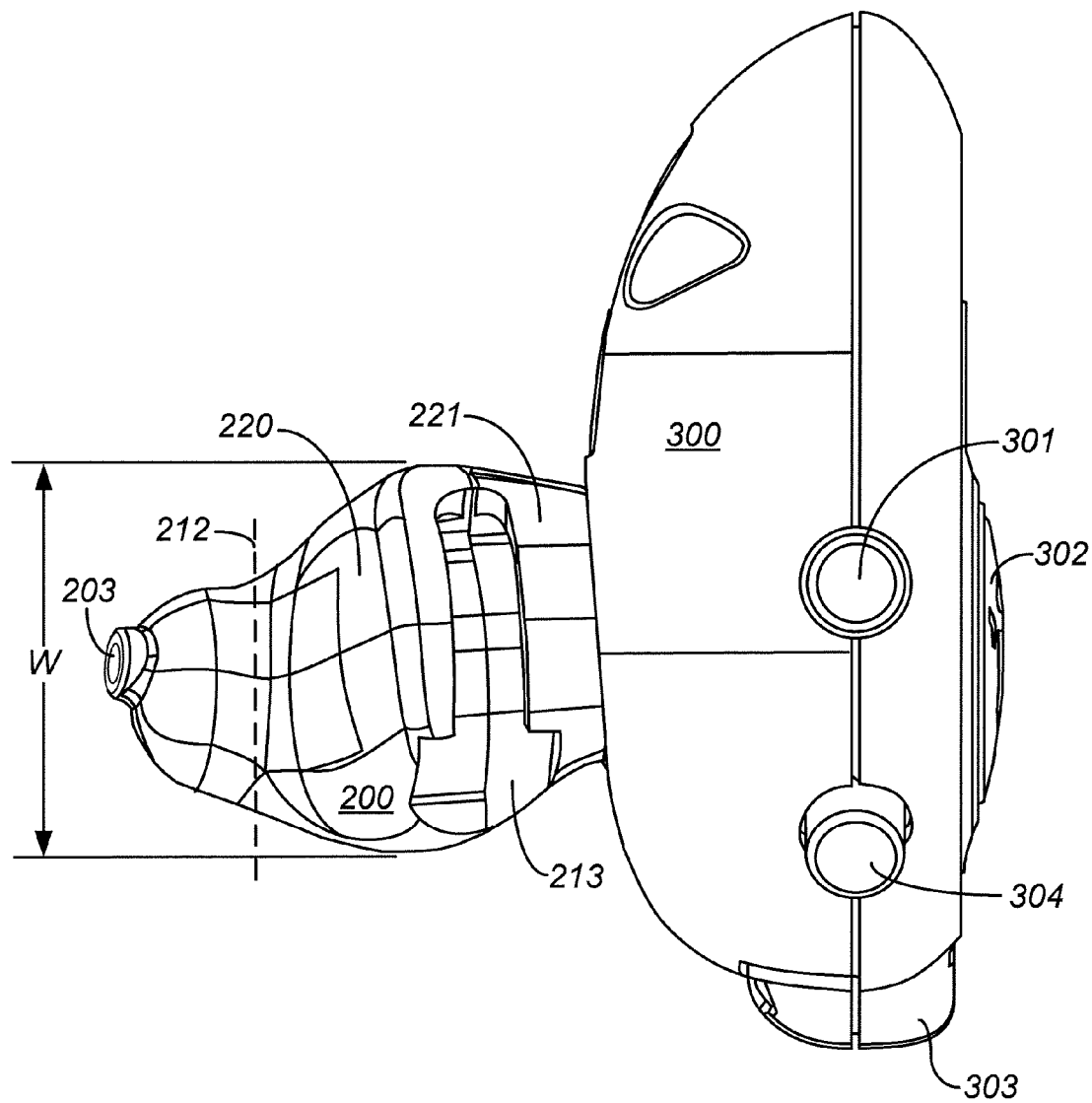
FIG. 6 is a view of the ear module housing of FIG. 3 from the rear.

FIG. 6 illustrates the ear module including the interior lobe 200 and the exterior lobe 300 from the rear facing toward the forward wall of the ear canal. The interior lobe 200 includes a surface 220 which is adapted to rest (unevenly) on the surface of the concha as described above. The interior lobe 200 includes the surface 221 which faces the antihelix, and in which the slot 213 is positioned to receive the ear loop. Interior lobe 200 is adapted to fit on a target ear so that the entrance of the ear canal 212 intersects the device near the location indicated. The interior lobe 200 has a width W in the illustrated embodiment which is about 14 mm. This dimension W can vary depending on the needs of a particular implementation for fit to a target ear, and to house components for the ear module. As illustrated in FIG. 6, the exterior lobe 300 is substantially larger than the concha, and is supported off of the ear so as not to block air flow into the open air passage in the ear canal.

Components of the exterior module 300 illustrated include the user interface button 301, a second user interface button 304, and the main interface button 302. In addition, the extension 303 which houses the microphones of the ear module from this view extends away and downwardly into the plane of the page.

Figure 7:
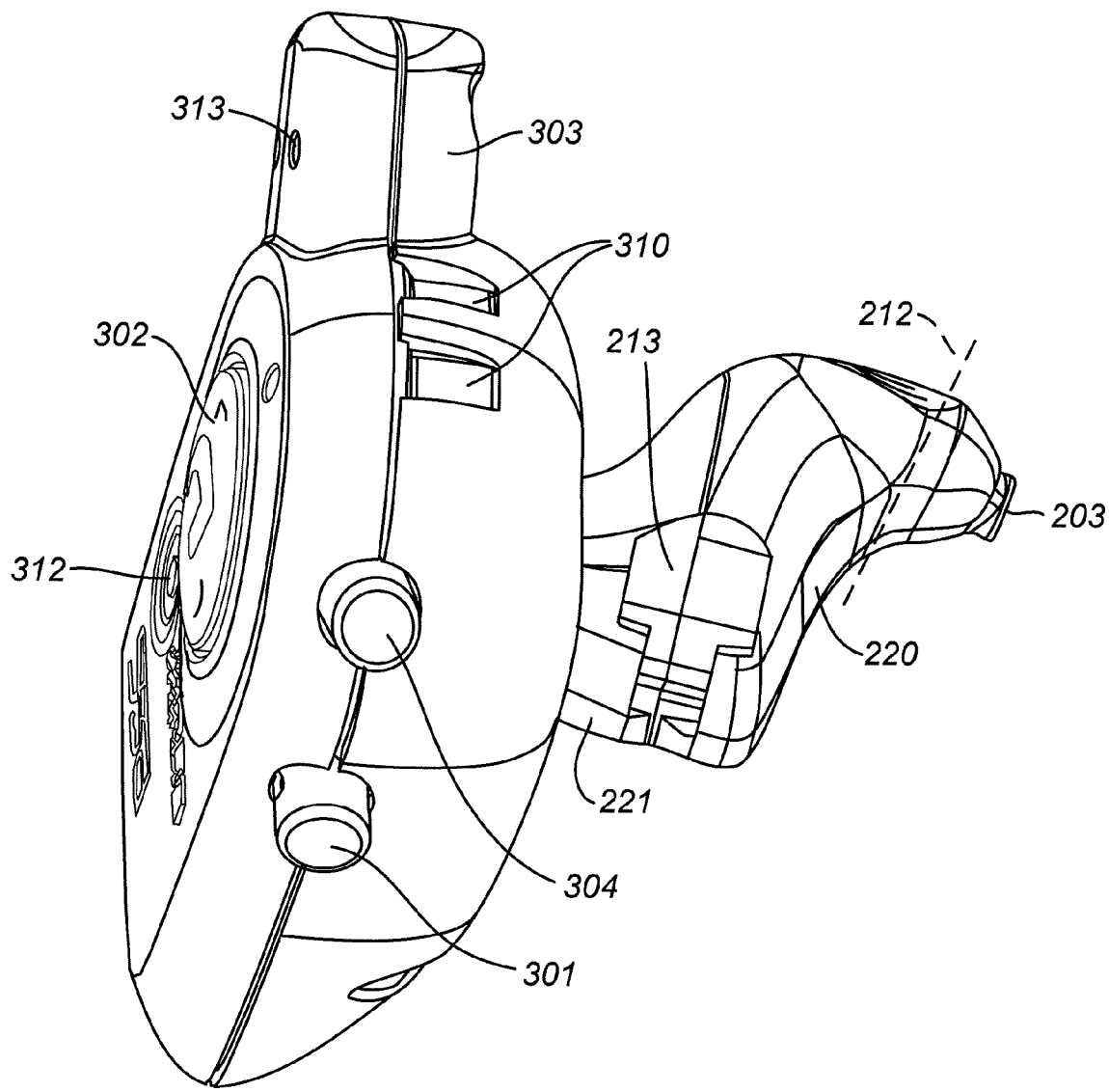
FIG. 7 is a perspective view of the ear module housing of FIG. 3.

FIG. 7 illustrates another perspective view of the exterior lobe 300 and interior lobe 200 of the ear module. As illustrated, the exterior lobe 300 of ear module includes the user interface buttons 301, 302 and 304. In addition, an LED 312 is housed on the exterior lobe. The extension 303 includes opening 313 for the microphone or microphones within the extension. Embodiments of the ear module have two openings on the extension 303 and two openings on the outside surface of the exterior lobe of the ear module to support an omnidirectional microphone and a directional microphone. Contacts 310 are provided for coupling the exterior lobe 300 of the ear module onto corresponding contact pins in a recharging cradle. Components of the interior lobe 200 of the ear module are labeled with the same reference numerals used in earlier figures.

Figure 8:
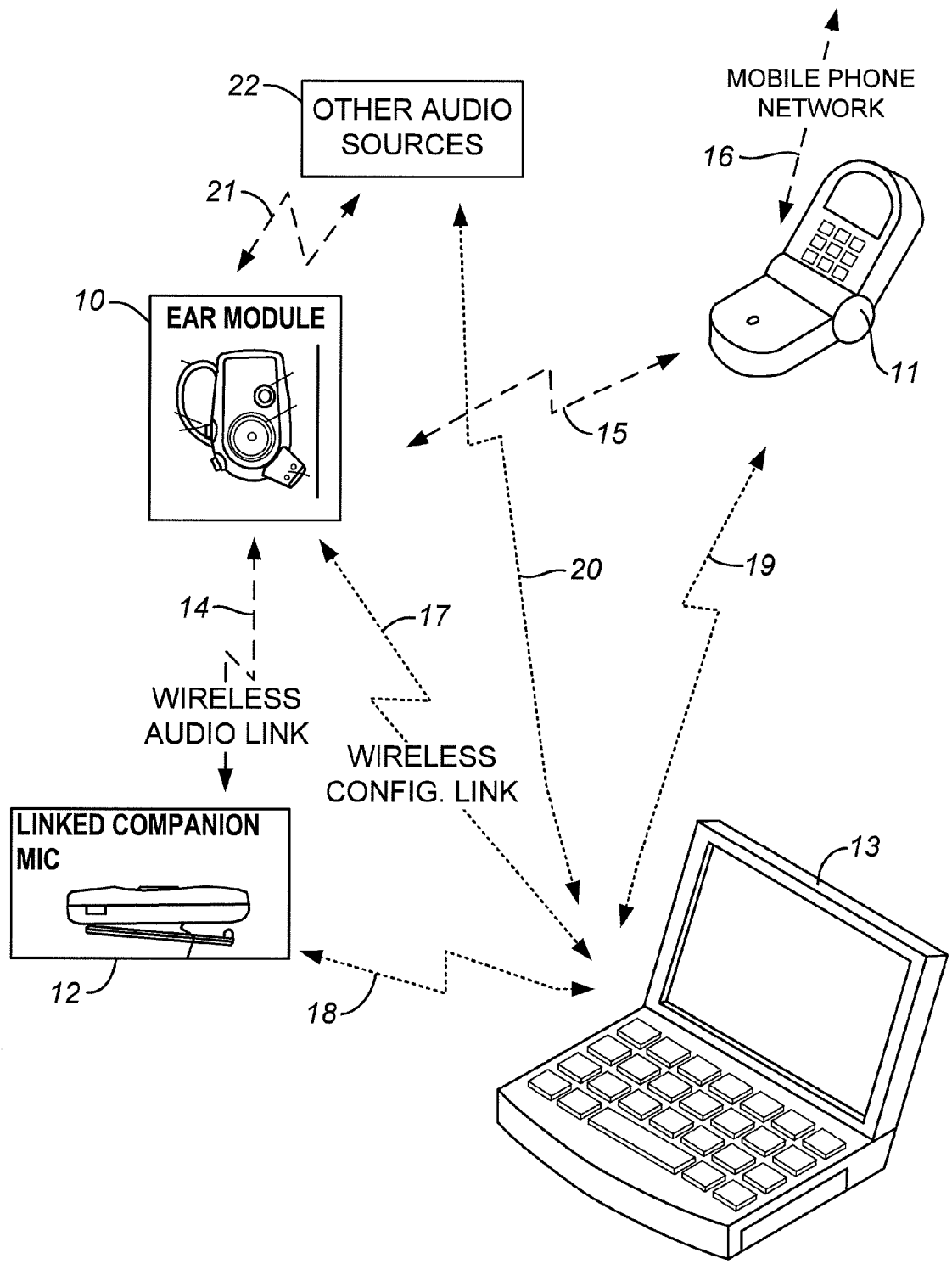
FIG. 8 illustrates a personal sound system including an embodiment of an ear module.

FIG. 8 illustrates a wireless network which extends the capabilities of an ear module 10, adapted to be worn at ear level, and operating in multiple modes. The ear module 10 preferably includes a hearing aid mode having hearing aid functionality. The network facilitates techniques for providing personalized sound from a plurality of audio sources such as mobile phones 11, other audio sources 22 such as televisions and radios, and with a linked companion microphone 12. In addition, wireless network provides communication channels for configuring the ear module 10 and other audio sources ("companion modules") in the network using a configuration host 13, which comprises a program executed on a computer that includes in interface to the wireless network. In one embodiment described herein, the wireless audio links 14, 15, 21 between the ear module 10 and the linked companion microphone 12, between the ear module 10 and the companion mobile phone 11, and between the ear module 10 and other companion audio sources 22, respectively, are implemented according to Bluetooth compliant synchronous connection-oriented SCO channel protocol (See, for example, Specification of the Bluetooth System, Version 2.0, 4 Nov. 2004). The wireless configuration links 17, 18, 19, between the configuration host 13 and the ear module 10, the mobile phone 11, the linked companion microphone 12, and the other audio sources 22 are implemented using a control channel, such as a modified version of the Bluetooth compliant serial port profile SPP protocol or a combination of the control channel and SCO channels. (See, for example, BLUETOOTH SPECIFICATION, SERIAL PORT PROFILE, Version 1.1, Part K:5, 22 Feb. 2001). Of course, a wide variety of other wireless communication technologies may be applied in alternative embodiments.

Companion modules, such as the companion microphone 12 consist of small components, such as a battery operated module designed to be worn on a lapel, that house "thin" data processing platforms, and therefore do not have the rich user interface needed to support configuration of private network communications to pair with the ear module. For example, thin platforms in this context do not include a keyboard or touch pad practically suitable for the entry of personal identification numbers or other authentication factors, network addresses, and so on. Thus, to establish a private connection pairing with the ear module, the radio is utilized in place of the user interface.

In embodiments of the network described herein, the linked companion microphone 12 and other companion devices may be "permanently" paired with the ear module 10 using the configuration host 13, by storing a shared secret on the ear module and on the companion module that is unique to the pair of modules, and requiring use of the shared secret for establishing a communication link using the radio between them. The configuration host 13 is also utilized for setting variables utilized by the ear module 10 for a processing audio data from the various sources. Thus in embodiments described herein, each of the audio sources in communication with the ear module 10 may operate with a different subset of the set of variables stored on the ear module for audio processing, where each different subset is optimized for the particular audio source, and for the hearing profile of the user. The set of variables on the ear module 10 is stored in nonvolatile memory on the ear module, and includes for example, indicators for selecting data processing algorithms to be applied and parameters used by data processing algorithms.

Figure 9:
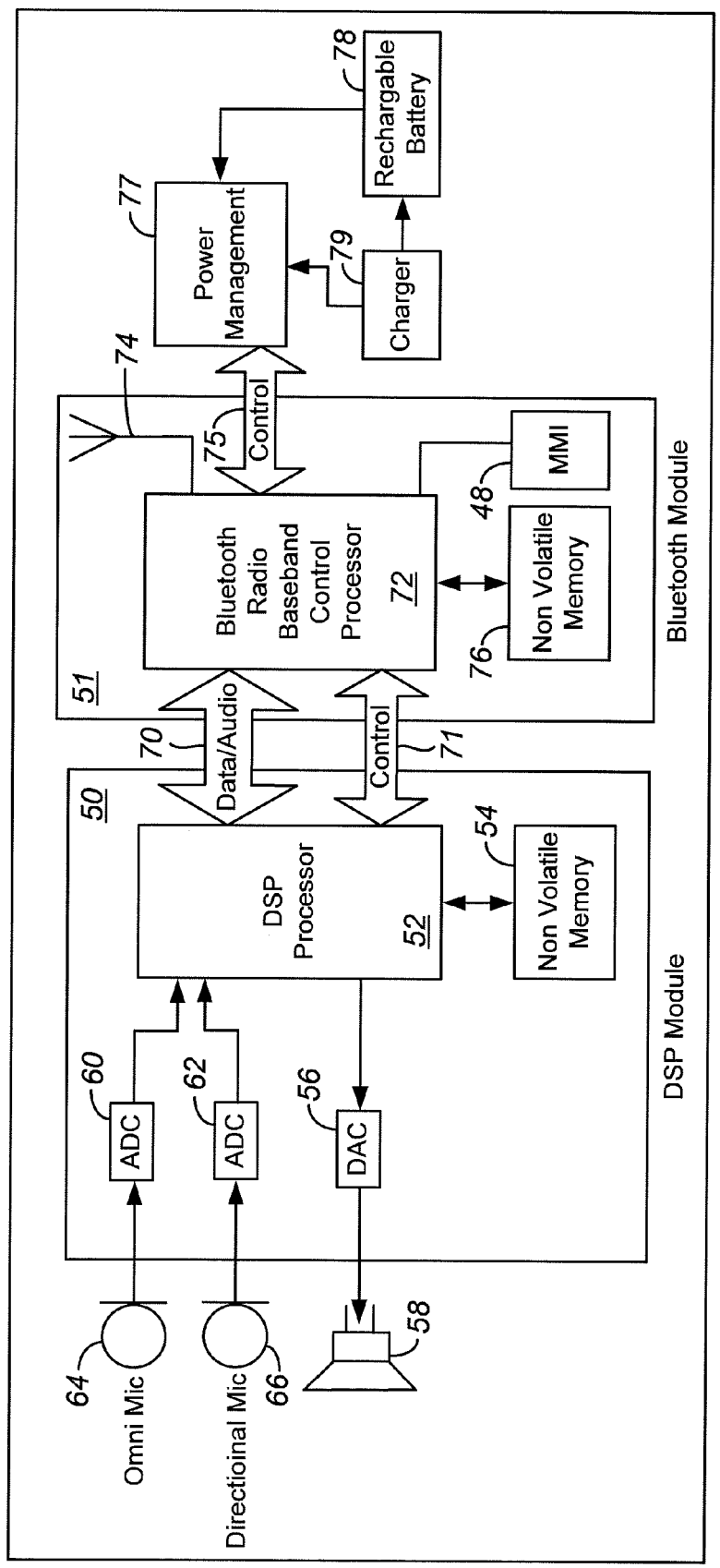
FIG. 9 is a simplified diagram of data processing resources within an ear module housing for an embodiment of the technology adapted for the personal sound system of FIG. 8.

FIG. 9 is a system diagram for microelectronic and audio transducer components of a representative embodiment of the ear module 10. The system includes a data processing module 50 and a radio module 51. The data processing module includes a digital signal processor 52 coupled to nonvolatile memory 54. A digital to analog converter 56 converts digital output from the digital signal processor 52 into analog signals for supply to speaker 58 at the tip of the interior lobe of the ear module. A first analog-to-digital converter 60 and a second analog-to-digital converter 62 are coupled to the omnidirectional microphone 64 and a directional microphone 66, respectively, on the exterior lobe of the ear module. The analog-to-digital converters 60, 62 supply digital inputs to the digital signal processor 52. The nonvolatile memory 54 stores computer programs that provide logic for controlling the ear module as described in more detail below. In addition, the nonvolatile memory 54 stores a data structure for a set of variables used by the computer programs for audio processing, where each mode of operation of the ear module may have one or more separate subsets of the set of variables, referred to as "presets" herein.

The radio module 51 is coupled to the digital signal processor 52 by a data/audio bus 70 and a control bus 71. The radio module 51 includes, in this example, a Bluetooth radio/baseband/control processor 72. The processor 72 is coupled to an antenna 74 and to nonvolatile memory 76. The nonvolatile memory 76 stores computer programs for operating a radio 72 and control parameters as known in the art. The radio processor module 51 also controls the man-machine interface 48 for the ear module 10, including accepting input data from the buttons and providing output data to the status light, according to well-known techniques.

A power control bus 75 couples the radio module 51 and the processor module 50 to power management circuitry 76. The power management circuitry 77 provides power to the microelectronic components on the ear module in both the processor module 50 and the radio module 51 using a rechargeable battery 78. A battery charger 79 is coupled to the battery 78 and the power management circuitry 77 for recharging the rechargeable battery 78.

The microelectronics and transducers shown in FIG. 9 are adapted to fit within the ear module 10.

The nonvolatile memory 76 is adapted to store at least first and second link parameters for establishing radio communication links with companion devices, in respective data structures referred to as "pre-pairing slots" in non-volatile memory. In the illustrated embodiment the first and second link parameters comprise authentication factors, such as Bluetooth PIN codes, needed for pairing with companion devices. The first link parameter is preferably stored on the device as manufactured, and known to the user. Thus, it can be used for establishing radio communication with phones and the configuration host or other platforms that provide user input resources to input the PIN code. The second link parameter also comprises an authentication factor, such as a Bluetooth PIN code, and is not pre-stored in the embodiment described herein. Rather, the second link parameter is computed by the configuration host in the field for private pairing of a companion module with the ear module. In one preferred embodiment, the second link parameter is unique to the pairing, and not known to the user. In this way, the ear module is able to recognize authenticated companion modules within a network which attempt communication with the ear module, without requiring the user to enter the known first link parameter at the companion module. Embodiments of the technology support a plurality of unique pairing link parameters in addition to the second link parameter, for connection to a plurality of variant sources of audio data using the radio.

In addition, the processing resources in the ear module include resources for establishing a configuration channel with a configuration host for retrieving the second link parameter, for establishing a first audio channel with the first link parameter, and for establishing a second audio channel with the second link parameter, in order to support a variety of audio sources.

Figure 10:
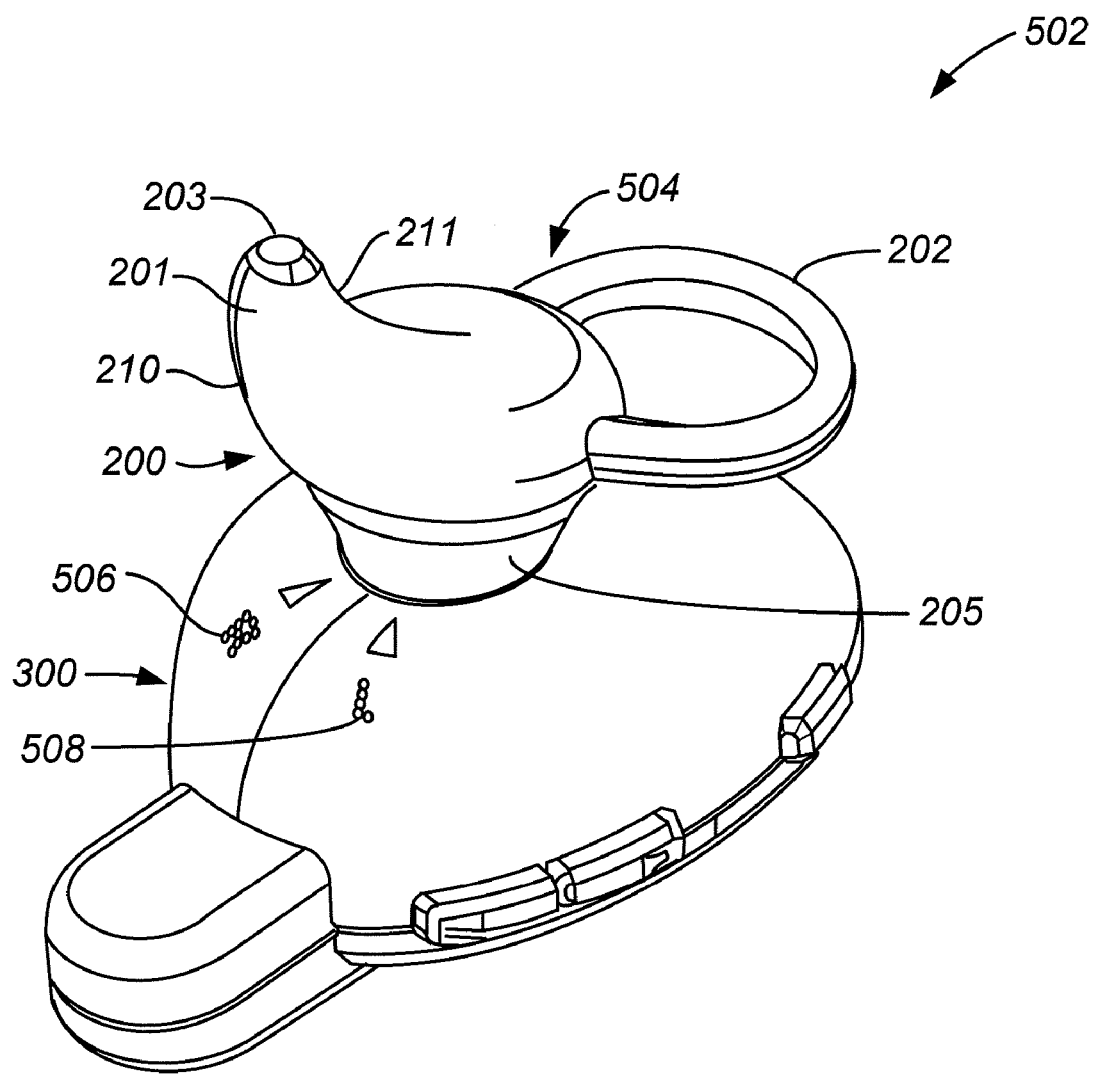
FIG. 10 is an alternative embodiment of an ear module.
Figure 11:
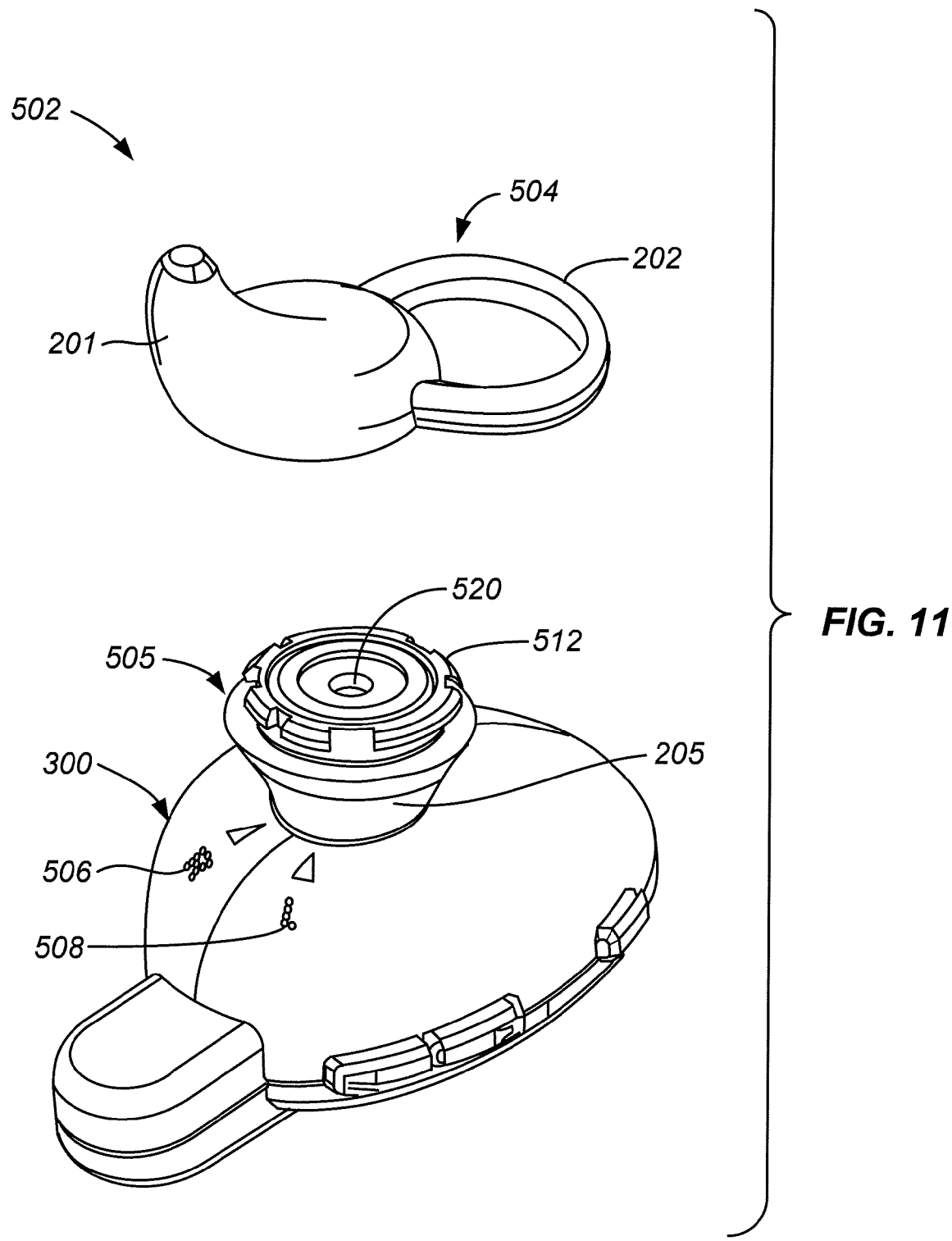
FIG. 11 is an exploded isometric view of the ear module of FIG. 10 with the ear loop/inner lobe cover assembly spaced apart from the remainder of the ear module.

FIGS. 10-18 illustrate a further embodiment of an ear module with like reference numerals referring to like elements. One of the differences between ear module 502 and the ear module of FIGS. 2-7 is that ear module 502 is designed to be selectively worn on either the left ear or the right ear. This is achieved by designing inner lobe 200 to include a removable and replaceable ear loop/inner lobe cover assembly 504, typically referred to as loop/cover assembly 504, designed to be mounted to the remainder 505 (see FIG. 11) of inner lobe 200 at two different positions. As shown in FIGS. 10 and 11, exterior lobe 300 has a right ear marking 506 and a left ear marking 508. Alignment of tip 203 with a selected one of markings 506, 508 permits ear module 502 to be worn on either the right or left ear of the user. Movement of loop/cover assembly 504 between the right ear and left ear orientations is achieved by rotating loop/cover assembly 504.

Figure 12:
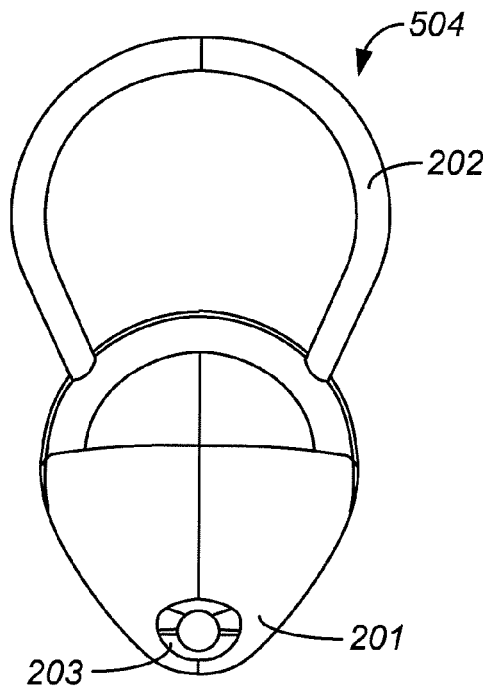
FIG. 12-14 are plan views showing different size ear loop/inner lobe cover assemblies of FIG. 11.
Figure 13:
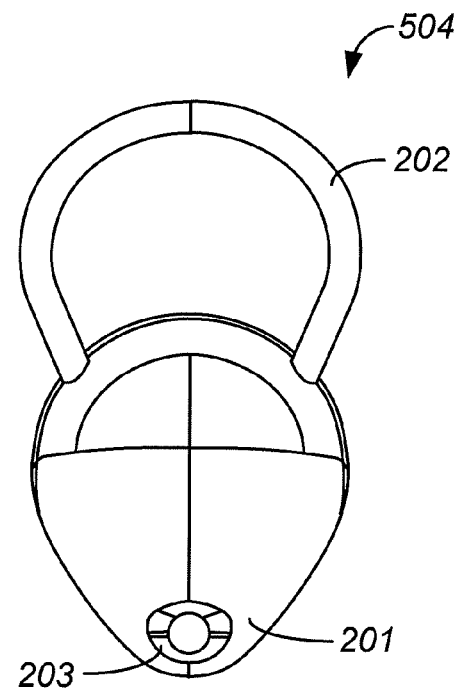
Figure 14:
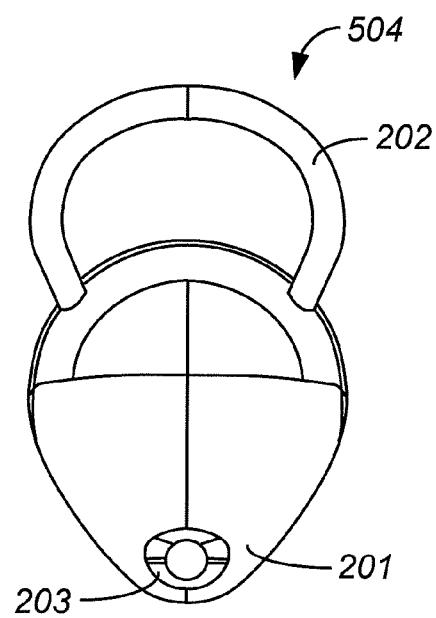
Figure 15:
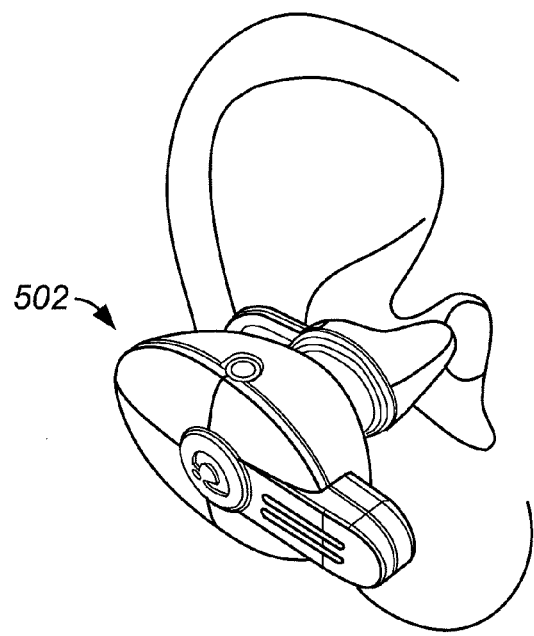
FIGS. 15 and 16 show the ear module of FIG. 10 in a right ear configuration.
Figure 16:
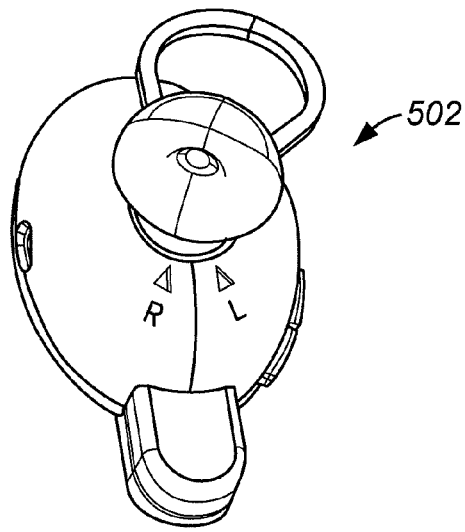
Figure 17:
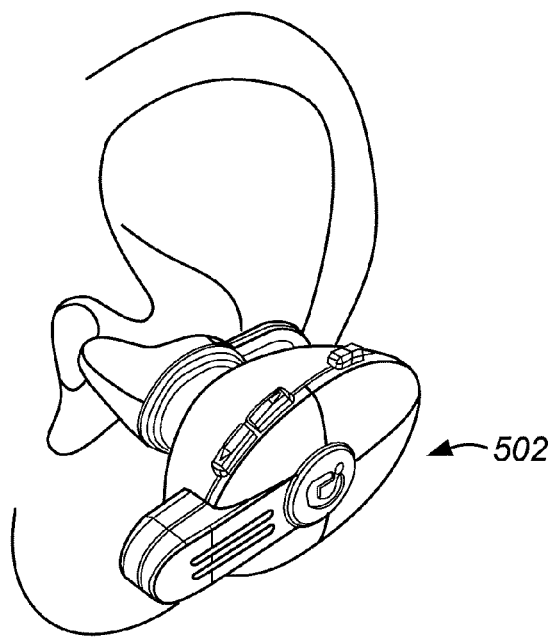
FIGS. 17 and 18 show the ear module of FIG. 10 in a left ear configuration.
Figure 18:
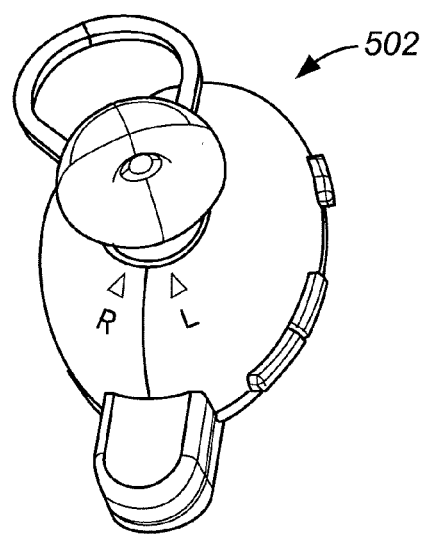

Although the size of extension 201 of inner lobe 200 typically does not need to be changed for adult users, the size of ear loop 202 often does. To accommodate different users, a set of loop/cover assemblies 504 are typically provided with ear module 502. A set of three different size assemblies 504 are shown in FIGS. 12-14. In some embodiments assemblies 504 are one piece structures made of one or more resilient materials chosen to provide sufficient structural strength to properly maintain ear module 502 on the user's ear while providing a high level of comfort. One example of a suitable material is silicone rubber suitable in transfer molding process. The use of ear module 502 in the right ear configuration is illustrated in FIGS. 15 and 16 and in the left ear configuration FIGS. 17 and 18. An advantage of the embodiment of FIGS. 10-18 is that the user can change the ear piece easily and quickly from one ear to the other for use preference and improved comfort especially during longer use.

Figure 19:
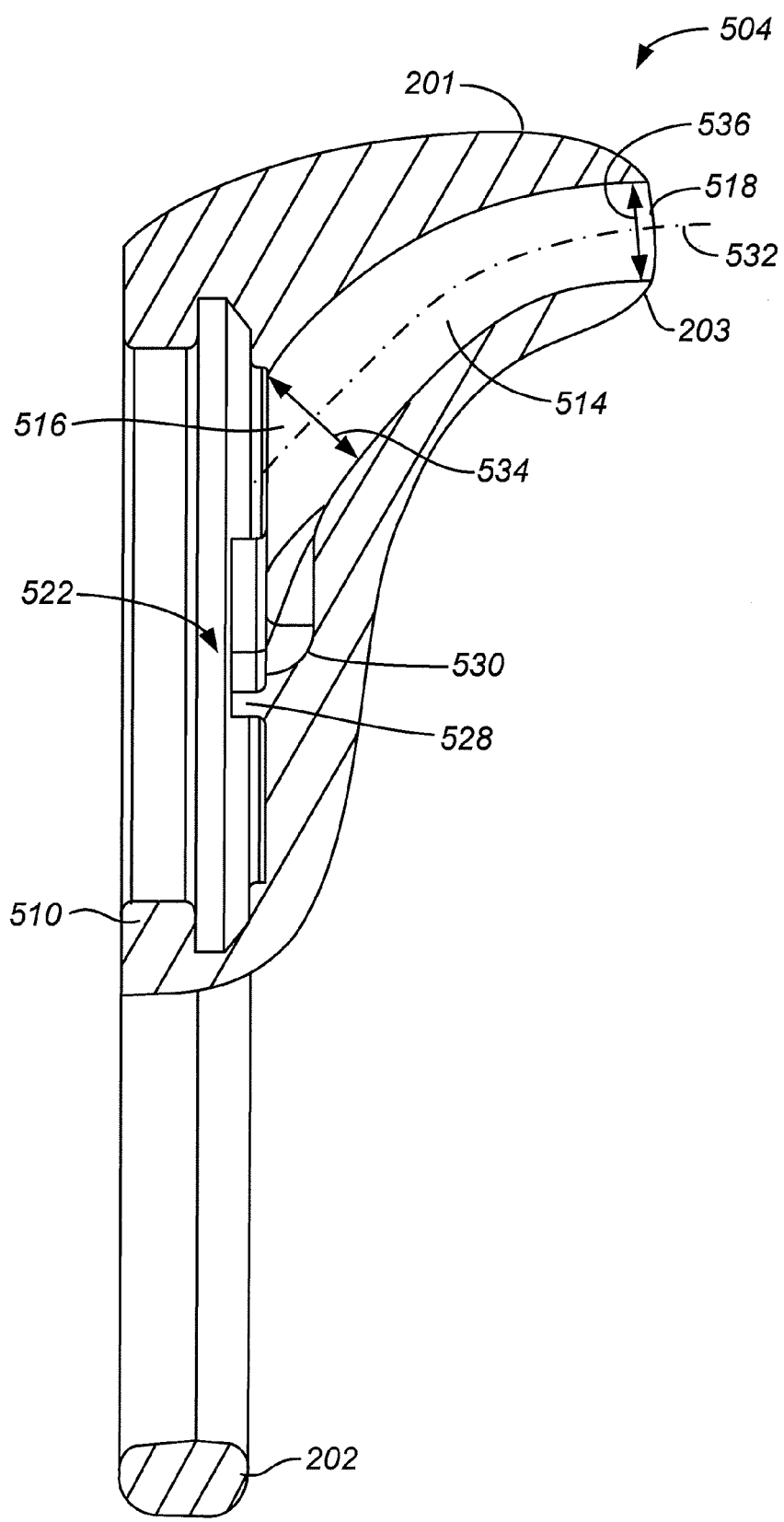
FIG. 19 is enlarged side cross-sectional view of the ear loop/inner lobe cover assembly of FIG. 11.
Figure 20:
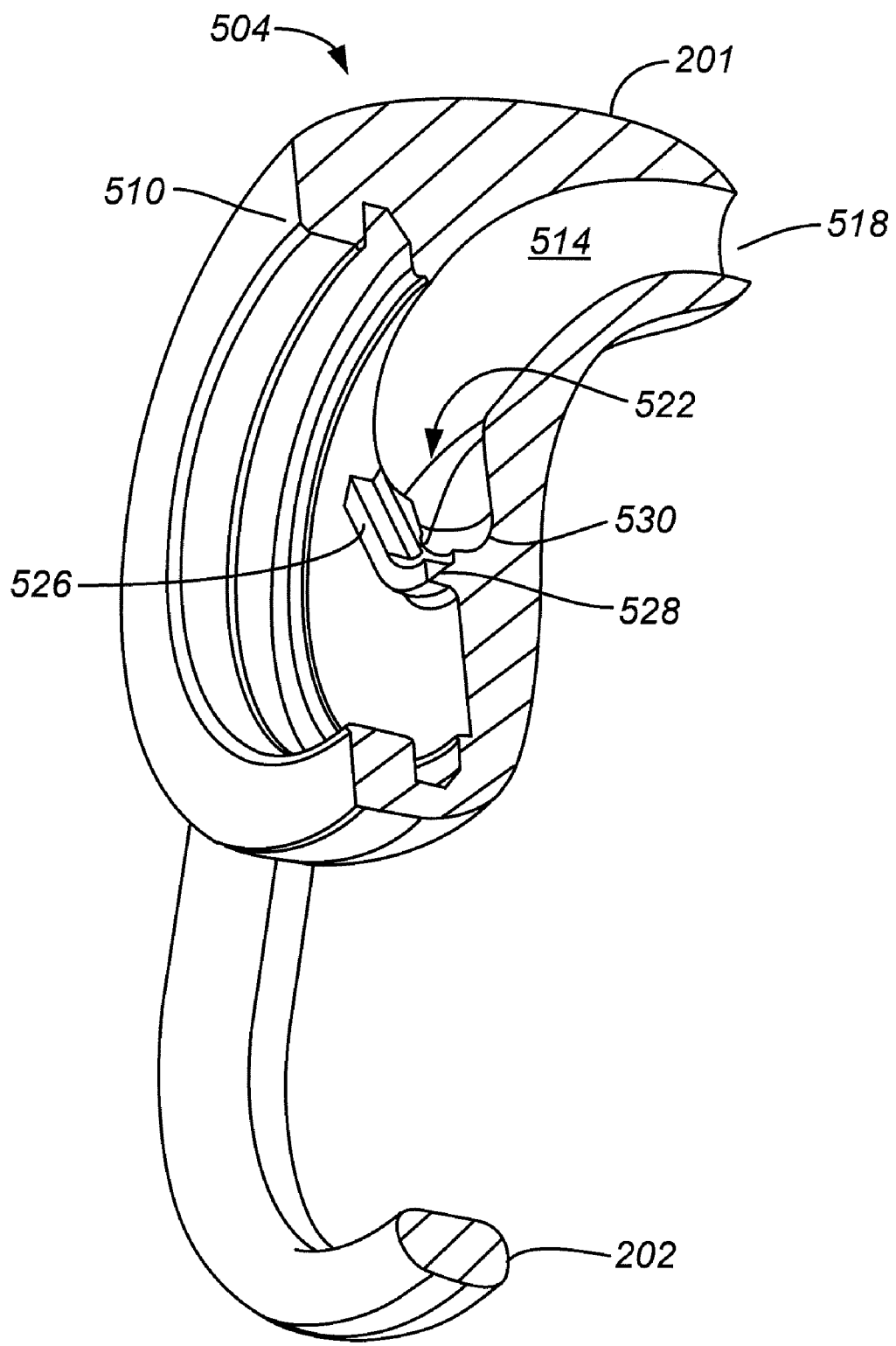
FIG. 20 is an enlarged isometric cross-sectional view of the ear loop/inner lobe cover assembly of FIG. 11.
Figure 21:
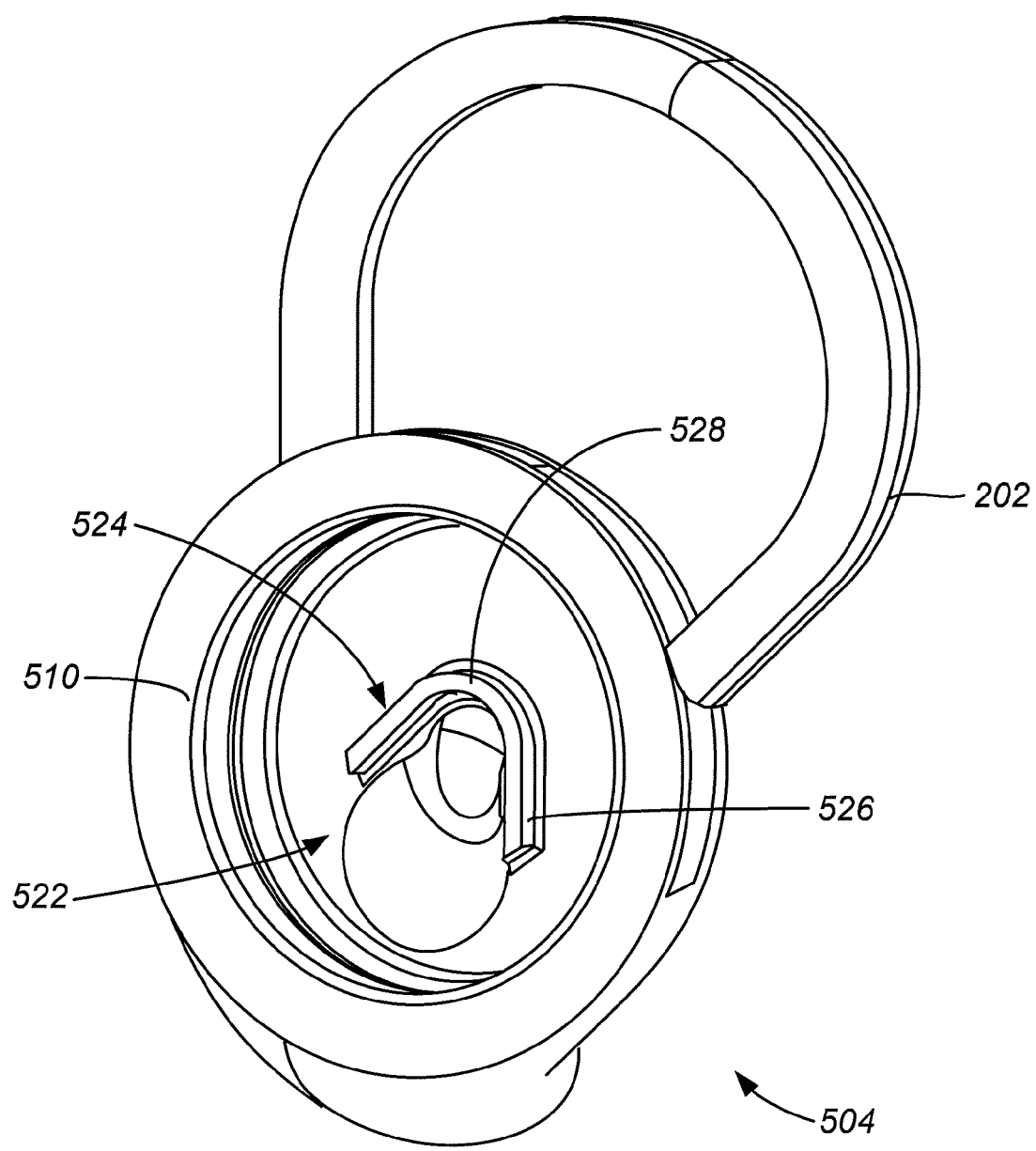
FIG. 21 is an enlarged isometric view of the back side of the ear loop/inner lobe cover assembly of FIG. 11.

Turning now to FIGS. 19-21, another aspect of loop/cover assembly 504 will be discussed. Assembly 504 includes an inwardly extending mounting lip 510, which engages over an outwardly extending lip 512 of remainder 505, shown in FIG. 11, to permit assembly 504 to be removably placed onto and removed from remainder 505 of inner lobe 200. Loop/cover assembly 504 defines a sound bore 514 having an entrance 516 and exit 518. Entrance 516 is radially offset from the center of mounting lip 510 and is also radially offset from the centrally mounted speaker 520, shown in FIG. 11. Entrance 516 of sound bore 514 is radially offset from speaker 520 in this example. In other examples entrance 516 may be centered on speaker 520. Speaker 520 is shown generally flush with the adjacent surface of remainder 505; it can, however, be made to protrude past or be recessed beneath the adjacent surface. In some examples speaker 520 may be positioned within sound bore 514 and either attached to loop/cover assembly 504 or remainder 505. Because of the lateral offset of entrance 516, loop/cover assembly 504 includes sound entrance deflector structure 522. Structure 522 includes a generally U-shaped sound deflector 524 having outwardly diverging legs 526 with a curved a base 528. Base 528 is generally centered on the center of mounting lip 510 and thus is generally centered on the center of speaker 520. Structure 522 also includes a concave recess 530 which opens into sound bore 514 at entrance 516. Deflector 524 generally surrounds concave recess 530. Sound entrance deflector structure 522 is used to direct sound towards entrance 516 of sound bore 514.

Sound bore 514 defines an axis 532 extending along the center of the sound bore. In some embodiments axis 532 is a generally smoothly curving axis with generally straight portions at entrance 516 and exit 518. Sound bore 514 has an entrance diameter 534 at entrance 516 measured perpendicular to axis 532 and exit diameter 536 at exit 518 measured perpendicular to axis 532. In some embodiments entrance diameter 534 is larger than exit diameter 536 with sound bore 514 typically tapered along at least a portion of its length.

In the design of ear module 502, it is preferred to obtain a flat frequency response and to extend the frequency response to somewhat higher frequencies. In some examples it is preferred that ear module 502 have a resonant peak near 2.7 kHz as well as a broad frequency range out to 5 kHz. The allowable decrease in high frequency response from the average of 500 Hz, 800 Hz, and 1600 Hz is preferably 20 dB. In some examples ear module 502 has a maximum 20 dB decrease in high frequency response, as measured at 5 kHz, from the average frequency response as measured at 500 Hz, 800 Hz, and 1600 Hz. The design of sound bore 514 is an important part of obtaining such desirable frequency response. The design of sound bore 514 depends in part on the sound characteristics of speaker 520 and the location of speaker 520 relative to entrance 514. Although it may be preferred to have speaker 520 aligned with entrance 516 and have a 1 mm diameter by 10 mm long, straight sound bore 514, tooling constraints may restrict the ability to do so resulting in the use of larger diameter, tapered, curved sound bores 514. Sound entrance deflector structure 522, including U-shaped deflector 524 and concave recess 530, is selected to help direct sound from speaker 520 into entrance 516 to improve acoustic performance. Electronic techniques are also used to shape the frequency response using digital signal processor 52; however, electronic signal processing techniques are not part of this invention.

The above descriptions may have used terms such as above, below, top, bottom, over, under, et cetera. These terms are used to aid understanding of the invention are not used in a limiting sense.

While the present invention is disclosed by reference to the preferred embodiments and examples detailed above, it is to be understood that these examples are intended in an illustrative rather than in a limiting sense. It is contemplated that modifications and combinations will occur to those skilled in the art, which modifications and combinations will be within the spirit of the invention and the scope of the following claims.

Any and all patents, patent applications and printed publications referred to above are incorporated by reference.

What is claimed is:

1. An ear module to be selectively worn on either left or right target ears, each target ear including an ear canal with an exterior opening, and having a forward wall, a rear wall, a concha, an anti-helix and a tragus, the ear module comprising:
   a housing for data processing resources, including an outer lobe and an inner lobe coupled to the outer lobe, the inner lobe comprising an extension and a speaker, the inner lobe adapted to fit within the concha;
   the inner lobe comprising a compressive member/cover assembly, the compressive member/cover assembly comprising a compressive member and the extension; and
   the compressive member providing a holding force between the anti-helix and the forward wall of the ear canal thereby securing the ear module on the ear, the extension adapted to extend into the exterior opening of the ear canal.

2. The module of claim 1, wherein the extension fits within the concha and beneath the tragus.

3. The module of claim 1, wherein the compressive member tends to bias the extension away from the anti-helix and against the forward wall of the ear canal helping to ensure an air gap is maintained between the rear wall of the ear canal and the inner lobe.

4. The module of claim 1, wherein the speaker is carried by the extension.

5. The module of claim 1, including a radio, a microphone and a data processor within the housing, the data processor adapted to process sound picked up by the microphone and sound received over the radio, and to play the processed sound on the speaker.

6. The module of claim 1, including a set of the compressive members, the compressive members being different sized compressive members to fit different sizes of ears.

7. The module of claim 1, wherein at least the compressive member is positionable relative to the outer lobe between left and right ear orientations to permit the ear module to be worn on either the left target ear or the right target ear.

8. The module of claim 7, wherein the compressive member/cover assembly is positionable between said left and right ear orientations.

9. The module of claim 8, wherein the compressive member/cover assembly is rotatable relative to the outer lobe.

10. The module of claim 8, wherein the compressive member/cover assembly is a one-piece resilient element.

11. The module of claim 8, wherein the compressive member/cover assembly is removably mounted to the remainder of the inner lobe.

12. The module of claim 11, including a set of compressive member/cover assemblies, the compressive member/cover assemblies having different sized compressive members to fit different sizes of ears.

13. An ear module system including an ear module to be selectively worn on either left or right target ears, each target ear including an ear canal with an exterior opening, having a forward wall, a rear wall, a concha, an anti-helix and a tragus, the ear module comprising:
   a housing for data processing resources, including an outer lobe and an inner lobe coupled to the outer lobe, the inner lobe comprising an extension and a speaker, the inner lobe adapted to fit within the concha;
   the inner lobe comprising a removable and replaceable compressive member/cover assembly, the compressive member/cover assembly comprising a compressive member and the extension;
   the compressive member providing a holding force biasing the extension away from the anti-helix and against the forward wall of the ear canal near the tragus with the compressive member tending to force the forward surface of the extension against the forward wall of the ear canal thereby securing the ear module on the ear and helping to ensure an air gap is maintained between the rear wall of the ear canal and the inner lobe, the extension adapted to extend into the exterior opening of the ear canal;
   the compressive member/cover assembly positionable relative to the remainder of the inner lobe between left and right ear orientations to permit the ear module to be worn on either the left target ear or the right target ear;
   the compressive member/cover assembly being removably mounted to the remainder of the inner lobe; and
   additional compressive member/cover assemblies, the compressive member/cover assemblies having different sized compressive members to fit different sizes of ears.

14. The system of claim 13, further comprising a radio, a microphone and a data processor within the housing, the data processor adapted to process sound picked up by the microphone and sound received over the radio, and to play the processed sound on the speaker.

15. A method for improving the quality of sound emanating from and ear module, the ear module of the type comprising a speaker and a portion extending into the ear canal of the user, the portion defining a sound bore having an exit and an entrance, the method comprising:
    selecting a shape for the sound bore, the sound bore defining an axis;
    selecting a length for the sound bore;
    selecting at least one cross-sectional size for the sound bore at positions along the axis;
    positioning the speaker at or near the entrance; and
    the selecting and positioning steps carried out to help improve the frequency response of the ear module so that the ear module has a resonant peak near 2.7 kHz and a maximum 20 dB decrease in high frequency response as measured at 5 kHz from the average frequency response as measured at 500 Hz, 800 Hz, and 1600 Hz.

16. The method of claim 15, wherein the shape selecting step is carried out by selecting a smoothly curving shape.

17. The method of claim 15, further comprising:
    choosing sound deflector structure for the entrance of the sound bore; and
    positioning the sound deflecting structure at the entrance to direct sound from the speaker into the entrance.

18. The method of claim 15, wherein the choosing and positioning steps are carried out to place a generally U-shaped deflector structure at the entrance.

19. A method for improving the quality of sound emanating from an ear module, the ear module of the type comprising a speaker and a portion extending into the ear canal of the user, the portion defining a sound bore having an exit and an entrance, the method comprising:
    selecting a smoothly curving sound bore, the sound bore defining an axis;
    selecting a length for the sound bore;
    selecting at least two cross-sectional sizes for the sound bore at positions along the axis;
    choosing sound deflector structure for the entrance of the sound bore;
    positioning the speaker entrance;
    positioning the sound deflecting structure at the entrance to direct sound from the speaker into the entrance without undesirable distortion; and
    the selecting, choosing and positioning steps carried out to help improve the frequency response of the ear module so that the ear module has a resonant peak near 2.7 kHz and a maximum 20 dB decrease in high frequency response as measured at 5 kHz from the average frequency response as measured at 500 Hz, 800 Hz, and 1600 Hz.

20. The method of claim 19, wherein the choosing and positioning steps comprise placing a generally U-shaped deflector structure at the entrance.

* * * * *